US007986053B2

(12) United States Patent
Bass

(10) Patent No.: US 7,986,053 B2
(45) Date of Patent: Jul. 26, 2011

(54) 24-VOLT ENGINE START-UP SYSTEM

(75) Inventor: Edward Albert Bass, Indianapolis, IN (US)

(73) Assignee: Remy Technologies, L.L.C., Anderson, IN (US)

( * ) Notice: Subject to any disclaimer, the term of this patent is extended or adjusted under 35 U.S.C. 154(b) by 281 days.

(21) Appl. No.: 12/076,031

(22) Filed: Mar. 13, 2008

(65) Prior Publication Data

US 2009/0230683 A1 Sep. 17, 2009

(51) Int. Cl.
*B60L 11/02* (2006.01)
*F02N 11/08* (2006.01)

(52) U.S. Cl. ...................................... 290/30 R; 320/123

(58) Field of Classification Search ................ 290/30 R; 320/123

See application file for complete search history.

(56) References Cited

U.S. PATENT DOCUMENTS 3,667,025 A * 5/1972 Campbell et al. ............. 320/123
3,671,843 A * 6/1972 Huntzinger et al. .......... 320/123
3,710,226 A * 1/1973 Seike ............................ 320/123
3,761,727 A * 9/1973 Santilli ........................ 290/40 R
3,793,544 A * 2/1974 Baumgartner et al. ........ 320/123
3,816,805 A * 6/1974 Terry ............................ 320/123
3,874,551 A * 4/1975 Harkness ...................... 320/123
4,045,718 A * 8/1977 Gray ............................. 320/123
4,412,137 A * 10/1983 Hansen et al. ............... 307/10.6
4,479,083 A * 10/1984 Sullivan ........................ 320/123
4,492,912 A * 1/1985 Nowakowski ................ 320/123
4,586,467 A * 5/1986 Raver ......................... 123/179.3
4,673,826 A * 6/1987 Masson ........................... 307/66
4,684,814 A * 8/1987 Radomski ....................... 290/31
4,723,105 A * 2/1988 Matouka et al. .............. 320/123
4,732,229 A * 3/1988 Lucht ........................... 180/69.6
4,743,830 A * 5/1988 Lakey ............................ 320/104
4,965,461 A * 10/1990 McRoberts et al. ......... 307/10.8
4,967,136 A * 10/1990 Nofzinger ..................... 320/116
5,528,122 A * 6/1996 Sullivan et al. ............... 320/118
5,701,068 A * 12/1997 Baer et al. ...................... 320/119
6,024,065 A 2/2000 Hojna et al. ............... 123/179.3
6,116,513 A * 9/2000 Perhats, Sr. .................... 237/2 A
6,242,887 B1 * 6/2001 Burke ........................... 320/104
6,362,595 B1 * 3/2002 Burke ........................... 320/104
6,455,951 B1 * 9/2002 Shultz et al. ................. 307/10.1
6,486,762 B2 11/2002 Kurasawa et al. ............ 335/278
6,690,140 B2 * 2/2004 Larson .......................... 320/104
6,717,291 B2 * 4/2004 Purkey ......................... 307/10.6
6,819,010 B2 11/2004 Burke .......................... 307/10.6
6,841,971 B1 * 1/2005 Spee et al. .................... 320/119
6,888,266 B2 * 5/2005 Burke et al. ................. 307/10.6
7,134,415 B2 * 11/2006 Burke et al. ............... 123/179.3
7,224,146 B2 * 5/2007 Poore et al. ...................... 322/28
7,352,154 B2 * 4/2008 Cook ............................ 320/116
7,782,015 B1 * 8/2010 Aaron ........................... 320/123
7,791,310 B2 * 9/2010 Luz et al. ...................... 320/104
2010/0201318 A1 * 8/2010 Sugiyama et al. ............ 320/120
2011/0012423 A1 * 1/2011 Gollmer et al. ................ 307/9.1
2011/0018476 A1 * 1/2011 Oriet et al. .................... 318/139
2011/0031046 A1 * 2/2011 Zolman et al. ................ 180/54.1

* cited by examiner

*Primary Examiner* — Pedro J Cuevas
(74) *Attorney, Agent, or Firm* — Finnegan, Henderson, Farabow, Garrett & Dunner

(57) ABSTRACT

An engine start-up system is disclosed. The engine start-up system has a 24-volt starter motor configured to crank the engine. The engine start-up system also has an energy source configured to supply electrical power to the starter motor. A 12-volt-operated magnetic switch is integrated with the 24-volt starter motor and is operable to permit the energy source to supply electrical power to the starter motor.

19 Claims, 4 Drawing Sheets

24-VOLT ENGINE START-UP SYSTEM

TECHNICAL FIELD

The present disclosure relates generally to internal combustion engines, and more particularly to a 24-volt engine start-up system.

BACKGROUND

Generally, diesel engines in on- and off-highway vehicles, construction equipment, and other machines need high cranking torque, which in turn, requires high cranking current. These machines may use on-board batteries to crank and start their main engines. In North American on-highway vehicles, the on-board batteries are usually a 12-volt energy source, which also usually provides power to operate a machine's other electrical components such as electronics, fans, and lighting.

Cranking and starting an engine may draw a significant amount of power from a vehicle's on-board battery. Typically, the on-board battery may be able to provide only three to four main engine cranking events before depleting the energy stored in the battery. Thus, if the engine fails to start after repeated attempts, and/or if the battery loses enough charge due to internal leakage, the charge present in the battery may be insufficient to start the main engine, and it may be both costly and time consuming to bring in the necessary service equipment to remedy such a problem. Moreover, cold weather conditions may exacerbate battery problems because batteries tend to lose significant amounts of charge in low temperature conditions.

Compared to the widely used 12-volt cranking systems, 24-volt cranking systems reduce the cranking current and provide additional voltage needed to crank the engine. However, converting an entire vehicle to utilize 24-volt electrical devices may be cost prohibitive. Moreover, many components of a vehicle, such as electronics, fans, and lighting, rely on 12 volts, usually supplied by the cranking battery. In addition, using the cranking battery to power other components of the vehicle places engine cranking at risk because the cranking battery is frequently discharged below acceptable energy levels to operate comfort and convenience accessories with the engine turned off.

The present disclosure is directed towards overcoming one or more of the problems set forth above.

SUMMARY

In one aspect, the present disclosure is directed to an engine start-up system. The engine start-up system includes a 24-volt starter motor configured to crank the engine. The engine start-up system also includes an energy source configured to supply electrical power to the starter motor. A 12-volt-powered magnetic switch is integrated with the 24-volt starter motor and is operable to permit the energy source to supply electrical power to the starter motor.

In another aspect, the present disclosure is directed to a method of starting an engine. The method includes integrating a 12-volt-powered magnetic switch with a 24-volt starter motor. The method further includes supplying 12 volts to operate the 12-volt magnetic switch and operating the 12-volt magnetic switch to permit supplying 24 volts to operate the 24-volt starter motor.

In yet another aspect, the present disclosure is directed to a machine having a combustion engine that is configured to power operations of the machine. The machine includes an interface that is configured to receive an input from a machine operator to start the engine. The machine further includes a 24-volt starter motor configured to crank the engine. The machine also includes an energy source configured to supply electrical power to the starter motor. A 12-volt-powered magnetic switch is integrated with the 24-volt starter motor and is operable to permit the energy source to supply electrical power to the starter motor.

DETAILED DESCRIPTION

Figure 1:
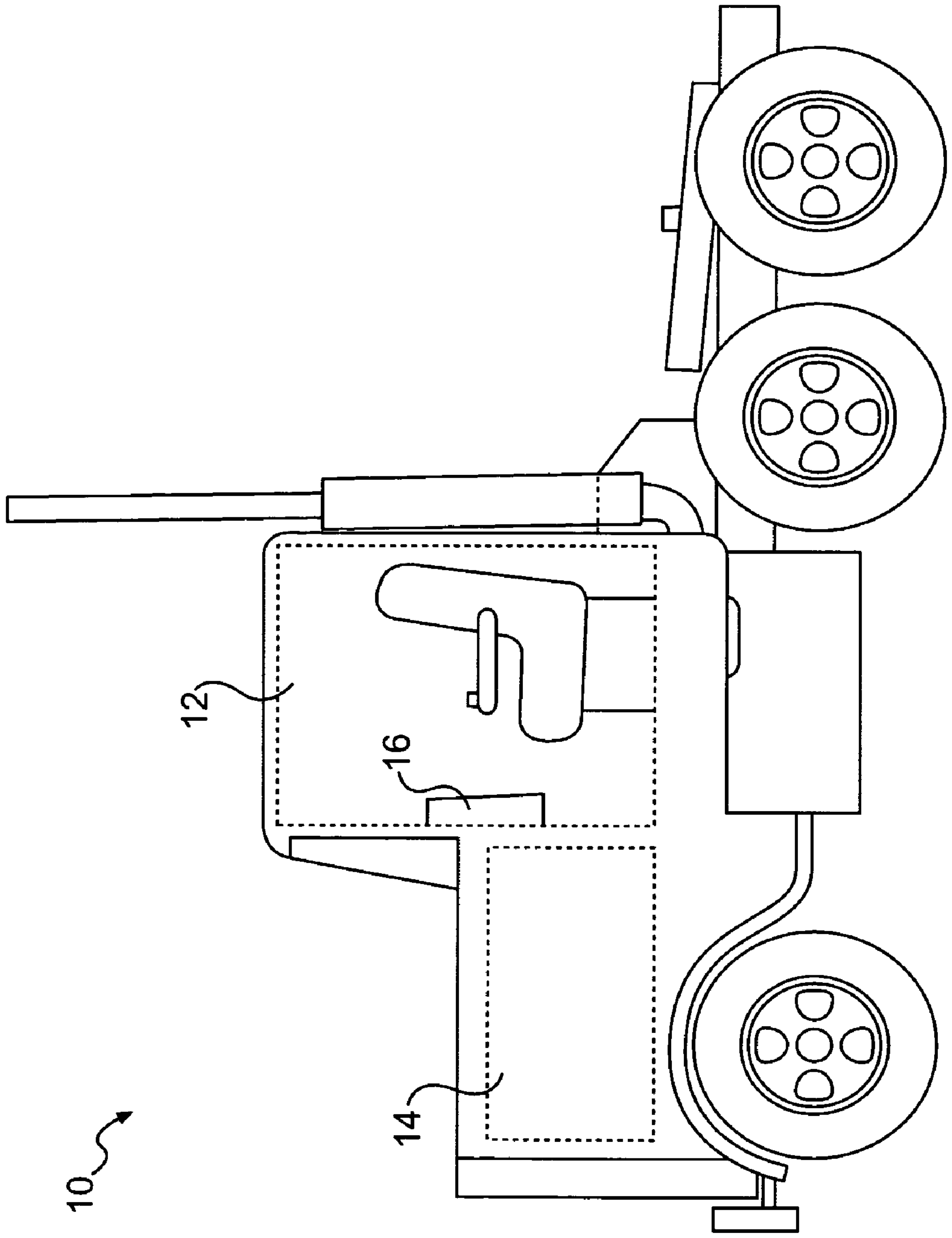
FIG. 1 is a diagrammatic view of a machine, according to an exemplary disclosed embodiment.

FIG. 1 provides a diagrammatic view of a machine 10 according to an exemplary disclosed embodiment. Machine 10 may include a cab 12 and an engine 14. While machine 10 may be an on-highway truck, it is contemplated that the present disclosure may be applicable to any other machine that has an engine. For example, machine 10 may include off-highway vehicles, passenger cars, construction equipment, earth-moving equipment, and generator sets.

Figure 2:
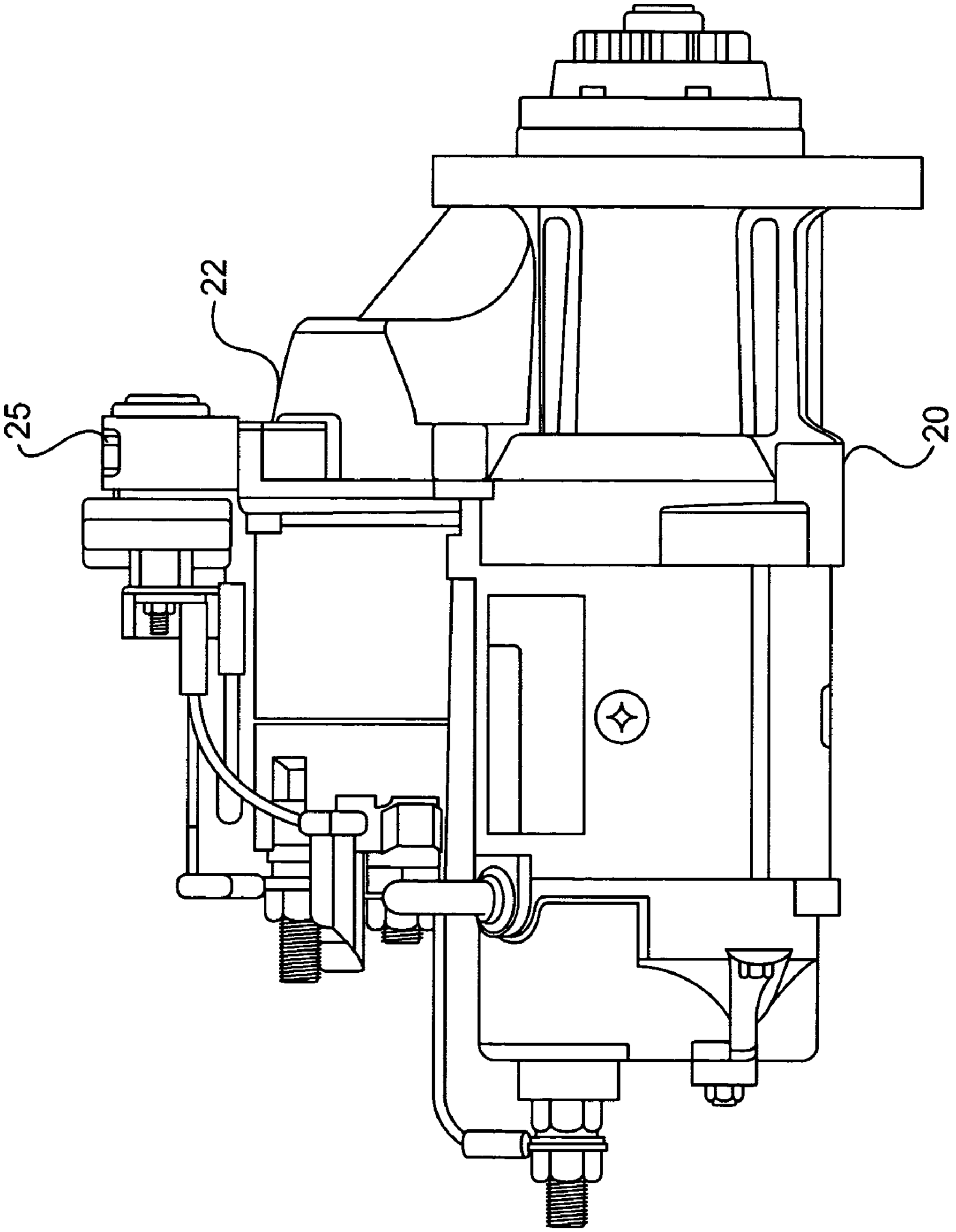
FIG. 2 is a diagrammatic view of machine components, according to an exemplary disclosed embodiment.

Engine 14 may include an internal combustion engine that operates using diesel fuel, gasoline, gaseous fuels, or other types of fuel as well as hybrid engine systems that run on a combination of fuel and electrical power. It is contemplated that engine 14 may provide power for operation of machine 10, including electrical power to run devices inside cab 12 and elsewhere on machine 10. The devices may include, for example, refrigerators, televisions, radios, or any other devices designed to provide comfort to an operator located within cab 12 and lights inside the cab and on the outside of machine 10. Engine 14 may produce electrical power to run these devices through use of an engine driven electrical generator or alternator (not shown). Engine 14 may also have functional relationships with other machine components such as, for example, a starter motor 20, a solenoid 22, and a magnetic switch 25 as shown in FIG. 2.

Figure 3:
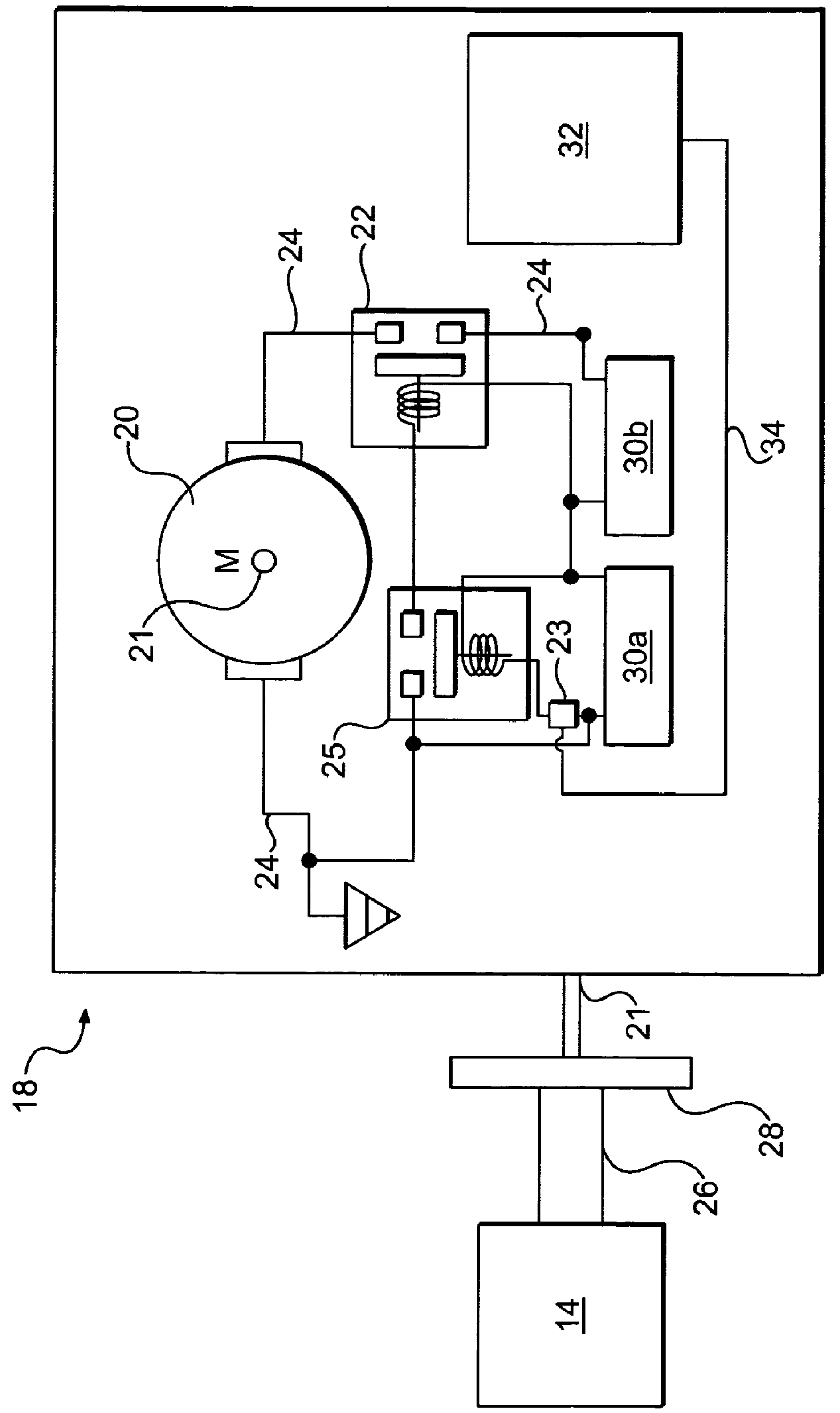
FIG. 3 is a block diagram of machine components, according to an exemplary disclosed embodiment.

Furthermore, these components may be part of a start-up system 18 shown in FIG. 3. The elements of system 18 may be interconnected by one or more electrical connections 24, that may include, for example, electrical wires or other suitable conductors known in the art.

Starter motor 20 may be coupled to crank engine 14 by way of a crankshaft 26. For example, an output shaft 21 of starter motor 20 may be connected to provide rotational power through a coupling means 28 to drive crankshaft 26. Starter motor 20 may have a dedicated power source 30 connected to drive it by way of electrical connections 24 and a solenoid 22. Starter motor 20 may also include a 24-volt DC electric motor that may be energized upon the initiation of an appropriate engine crank command signal. A 12-volt-powered magnetic switch 25 may be integrated with starter motor 20 to provide current to operate the solenoid 22 upon receiving the appropriate engine crank command signal.

Power source 30 may embody one or more batteries **30*a*, 30*b* configured to provide electrical power to terminals of starter motor 20 by way of electrical connections 24 during an engine cranking event. For example, power source 30 may comprise a battery pack or assembly having a plurality of individual batteries 30***a*, 30*b* connected in parallel and/or in series to provide a DC electrical current to a known solenoid 22 associated with starter motor 20. One such configuration is illustrated in which the power supply 30 is two 12-volt energy sources 30*a*, 30*b*, connected in series to provide the required 24 volts to power starter motor 20 and 12 volts to operate the magnetic switch 25. Alternatively, power source 30 may include a single 24-volt energy source to power the starter motor 20 and a separate 12-volt energy source to operate the 12-volt magnetic switch 25. It is to be appreciated, however, that the batteries and/or power sources may be replaced with another suitable electrical power source, such as, for example, an AC power source and a rectifier, if desired. When an engine cranking event is commanded by a controller 32, the solenoid 22 may permit electrical current to flow from the power supply 30 through electrical connections 24 to drive motor 20 and crank engine 14.

Magnetic switch 25 may be used for closing or opening an electrical circuit by way of the solenoid 22 to operably allow supplying electrical power to starter motor 20. Magnetic switch 25 may include a 12-volt-powered magnetic switch. A dedicated power supply 30*a*, in the form of a 12-volt battery, may provide energy to operate magnetic switch 25 upon receipt an appropriate engine crank command provided by the controller 32 via communication line 34 to a control device 23, such as a remote-controllable electric switch or other well known device. Magnetic switch 25 may be any switch appreciable to one of ordinary skill in the art.

Cab 12 may include an enclosed area of machine 10 configured to house the operator. Cab 12 may also include an operator interface 16 that may contain dials and/or controls for conveying information and for operating machine 10 and its various components. Interface 16 may include a monitor, a touch-screen, a portable hand-held device, a keypad, a control panel, a keyboard, an off-board command and control system, and/or other suitable input devices. Interface 16 may receive input from a machine operator and generate corresponding command signals in response to the input, which may be communicated to controller 32 for processing and/or execution. In one aspect, interface 16 may include a starter mode selection device such as, for example, a knob, a dial, a selector switch, one or more buttons, etc., allowing the operator to select an automatic starter mode and a manual starter mode. In response to an operator's selection of a desired starter mode, interface 16 may communicate a corresponding selection signal to controller 32.

Interface 16 may also include means for receiving a machine operator's request to start engine 14 and for generating a corresponding start request signal. The means for receiving and generating may include magnetic switch 25 configured to receive a coded key having magnetic information thereon, a memory chip embedded thereon, a radio-frequency identification circuit (RFID) thereon, a keypad allowing the code to be manually entered by an operator, a data port allowing direct communication with a service tool or a computer having the code, an antenna allowing reception of the code from a remote location, a scanner configured to read coded indicia, or any other configuration that can receive the code and generate a signal indicative of the code. Interface 16 may also display data relating to machine and/or starter status in response to signals from controller 32.

Cranking of engine 14 may be regulated by controller 32. Controller 32 may include, for example, an electronic control module (ECM) or another processor capable of executing, and/or or outputting command signals in response to received and/or stored data. Controller 32 may include computer-readable storage, such as read-only memories (ROM), random-access memories (RAM), and/or flash memory; one or more secondary storage device, such as a tape-drive and/or magnetic disk drive; one or more microprocessor (CPU), and/or any other components for running an application and processing data. The microprocessor(s) may comprise any suitable combination of commercially-available or specially-constructed microprocessors for controlling system operations. As such, controller 32 may include instructions and/or data stored as hardware, software, and/or firmware within the memory, secondary storage device(s), and/or microprocessor (s). Alternatively or additionally, controller 32 may include and/or be associated with various other suitably arranged hardware and/or software components. For example, controller 32 may include power supply circuitry, signal conditioning circuitry, solenoid driver circuitry, amplifier circuitry, timing circuitry, filtering circuitry, switches, and/or other types of circuitry, if desired.

Controller 32 may include one or more data storage structures in the computer-readable medium containing predetermined data to facilitate starter control determinations in connection with an algorithm of machine 10. The data storage structures may include, for example, arrays matrices, tables, variable classes, etc. The predetermined data may be based on known machine and/or starter control system performance specifications, such as those of engine 14, starter motor 20, power source 30, and/or other components or systems of machine 10. The predetermined data may be derived from performance test results, engineering knowledge, and/or other resources. For example, the data storage may include an appropriate engine speed at which ignition should take place, lookup tables defining the amounts of electrical current, fluid displacement rates, and/or pressures required to provide an appropriate torque to crank engine to the ignition speed for a variety of power source capacities.

Controller 32 may also receive a signal from operator interface 16 indicating selection of an automatic start mode or selection of a manual start mode to initiate cranking of engine 14. Controller 32 may further receive a signal from operator interface 16 indicative of the operator's request to start engine 14 (e.g., turning a key and/or pressing a button). Based on these signals controller 32 may reference and utilize the stored signal parameters to generate an appropriate crank request signal directed to starter motor 20 by powering magnetic switch 25 which, in turn, powers the solenoid 22 to initiate cranking of engine 14.

Coupling means 28 may embody, for example, an engine flywheel ring gear and an overrunning clutch mechanism having a shifting pinion to engage the ring gear upon initiation of an engine start event. Alternatively, coupling means 28 may comprise a belt-drive arrangement. It is to be appreciated, however, that the output shafts of starter motor 20 may be otherwise directly or indirectly connected to provide rotational power to crankshaft 26 in a suitable manner.

Figure 4:
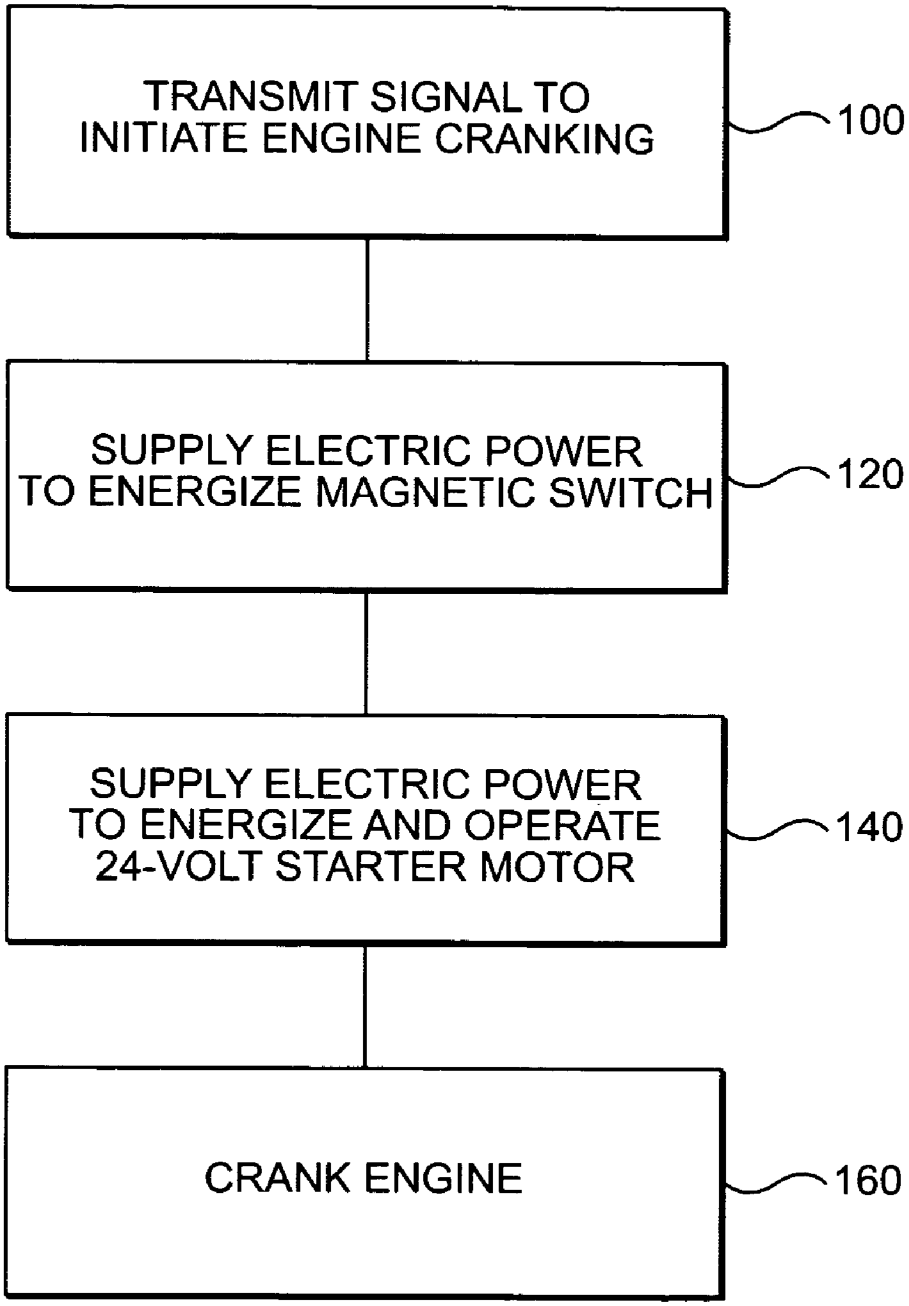
FIG. 4 is a flow diagram of a method, according to an exemplary disclosed embodiment.

FIG. 4 illustrates an exemplary method of operating start-up system 18. FIG. 4 will be described in detail in the following section.

INDUSTRIAL APPLICABILITY

The disclosed system 18 for starting an engine may have wide application in a variety of engine types including, for example, diesel engines, gasoline engines, gaseous fuel powered engines, and hybrid engines may be implemented into any engine appreciable to an ordinarily skilled artisan.

Controller 32 may send a signal, such as the appropriate engine crank command signal via, communication line 34 to initiate engine cranking (step 100) by sending the signal to supply electric power to energize magnetic switch 25 (step 120). Magnetic switch 25 may be energized by supplying 12-volts of energy from power source 30. For example, 12-volt power supply 30*a* may provide the electrical power necessary to energize magnetic switch 25. Magnetic switch 25 may be integrated with starter motor 20 and may transmit current to operate the solenoid 22 of the starter motor 20.

Upon operation of the solenoid 22 power source 30 is connected to supply electrical power to operate 24-volt starter motor 20 (step 140). For example, two 12-volt power supplies 30*a*, 30*b*, connected in series, may provide the requisite 24 volts to energize and operate starter motor 20 upon operation of the solenoid 22. Starter motor 20 may then crank engine 14 (step 160).

It will be apparent to those skilled in the art that various modifications and variations can be made to the disclosed system and method without departing from the scope of the disclosure. Additionally, other embodiments of the disclosed system and methods will be apparent to those skilled in the art from consideration of the specification. It is intended that the specification and examples be considered as exemplary only, with a true scope of the disclosure being indicated by the following claims and their equivalents.

What is claimed is:

1. An engine start-up system, comprising:
- a 24-volt starter motor configured to crank an engine;
- an energy source configured to supply electrical power to the starter motor;
- a first 12-volt-operated magnetic switch; and
- a second 12-volt-operated magnetic switch;
- wherein the first magnetic switch is integrated with the 24-volt starter motor and operable to provide current to the second magnetic switch to permit the energy source to supply electrical power to the starter motor.

2. The system of claim 1, wherein the energy source includes a battery assembly.

3. The system of claim 1, wherein the energy source is further configured to supply electrical power to the first magnetic switch.

4. The system of claim 1, wherein the energy source includes at least two 12-volt energy sources connected in series.

5. The system of claim 4, wherein one of the at least two 12-volt energy sources is configured to supply electrical power to the first magnetic switch.

6. The system of claim 1, wherein the first magnetic switch is configured to be operated by a remote-controllable electric switch.

7. The system of claim 1, wherein the magnetic switch is powered by a battery assembly.

8. A method of starting an engine comprising:
- integrating first and second 12-volt-operated magnetic switches with a 24-volt starter motor;
- supplying 12 volts to operate the first 12-volt magnetic switch;
- operating the first 12-volt magnetic switch to supply 12 volts to operate the second 12-volt magnetic switch; and
- operating the second 12-volt magnetic switch to supply 24 volts to operate the 24-volt starter-motor.

9. The method of claim 8, further including supplying the 24 volts by a battery assembly.

10. The method of claim 8, wherein supplying the 24 volts and the 12 volts includes supplying by a 24-volt power supply.

11. The method of claim 8, wherein supplying the 24 volts includes supplying by at least two 12-volt power supplies connected in series.

12. The method of claim 11, wherein supplying the 12 volts to the first 12-volt magnetic switch includes supplying from one of the two at least 12-volt power supplies.

13. The method of claim 8, wherein supplying the 12 volts to the first 12-volt magnetic switch includes supplying from a battery assembly.

14. A machine, comprising:
- a combustion engine configured to power operations of the machine;
- an interface configured to receive input from a machine operator to start the engine;
- a 24-volt starter motor configured to crank the engine;
- an energy source configured to supply electrical power to the starter motor; and
- a 12-volt-operated magnetic switch integrated with the 24-volt starter motor and operable to permit the energy source to supply electrical power to the starter motor;
- wherein the energy source is further configured to supply electrical power to the 12-volt-operated magnetic switch.

15. The machine of claim 14, wherein the energy source includes a battery assembly.

16. The machine of claim 14, wherein the 12-volt-operated magnetic switch is a first 12-volt-operated magnetic switch, the machine further including:
- a second 12-volt-operated magnetic switch configured to be operated by the first 12-volt-operated magnetic switch.

17. The machine of claim 14, wherein the energy source includes at least two 12-volt energy sources connected in series.

18. The machine of claim 14, further including a controller configured to receive an interface signal from the interface and generate and send a crank request signal to the 12-volt starter motor, wherein the interface signal is indicative of a request to start an engine.

19. The machine of claim 14, wherein the magnetic switch is powered by a battery assembly.

* * * * *